United States Patent
Hsu

(10) Patent No.: US 10,441,107 B2
(45) Date of Patent: Oct. 15, 2019

(54) MULTI-POWER-SOURCE MOTOR ASSEMBLY FOR ROTISSERIE

(71) Applicant: Huang-Hsi Hsu, Taipei (TW)

(72) Inventor: Che-Jui Hsu, Taipei (TW)

(73) Assignee: Huang-Hsi Hsu, Taipei (TW)

(*) Notice: Subject to any disclaimer, the term of this patent is extended or adjusted under 35 U.S.C. 154(b) by 396 days.

(21) Appl. No.: 15/343,273

(22) Filed: Nov. 4, 2016

(65) Prior Publication Data
US 2017/0127879 A1    May 11, 2017

(30) Foreign Application Priority Data

Nov. 6, 2015  (TW) .............................. 104136627 A

(51) Int. Cl.
*A47J 37/04*  (2006.01)
*H02K 7/116*  (2006.01)

(52) U.S. Cl.
CPC ........... *A47J 37/041* (2013.01); *A47J 37/042* (2013.01); *A47J 37/049* (2013.01); *H02K 7/116* (2013.01)

(58) Field of Classification Search
CPC ...... A47J 31/041; A47J 31/047; A47J 31/042; A47J 31/049
USPC ...... 99/419, 421 H, 421 HH, 421 HV, 421 V
See application file for complete search history.

(56) References Cited

U.S. PATENT DOCUMENTS

| | | | | |
|---|---|---|---|---|
| 3,742,839 A * | 7/1973 | Maley | ................. | A47J 37/0745 126/25 R |
| 4,562,771 A * | 1/1986 | Williams | .............. | A47J 37/041 126/338 |
| 5,410,948 A * | 5/1995 | Eickmeyer | ............ | A47J 37/041 99/335 |
| 5,613,774 A * | 3/1997 | Chandra | ................. | A47J 27/04 366/228 |
| 6,460,481 B1 * | 10/2002 | Young | ...................... | A23G 3/28 118/14 |
| 6,508,167 B1 * | 1/2003 | Lu | ....................... | A47J 37/0745 99/419 |
| 7,707,928 B1 * | 5/2010 | Kamps | .................. | A47J 37/043 126/25 AA |
| 2012/0255537 A1 * | 10/2012 | Kanwar | .............. | A47J 37/0704 126/25 AA |

* cited by examiner

*Primary Examiner* — Reginald Alexander
(74) *Attorney, Agent, or Firm* — Bacon & Thomas, PLLC

(57) ABSTRACT

A multi-power-source motor assembly for a rotisserie includes: a housing with a receiving space, in whose lower portion a battery or a mobile power pack can be mounted; a fixing base mounted in an upper portion of the receiving space; a motor and a reduction gear unit, both mounted on the fixing base, wherein the reduction gear unit has an input gear meshing with the motor and an output gear provided with an output shaft for connecting with a spit; battery connections and a mobile power pack socket, both mounted in the lower portion of the receiving space, wherein the battery connections are connectable to the battery, and the mobile power pack socket is connectable to the mobile power pack; and a power switch mounted on the housing and electrically connected to the battery connections, the mobile power pack socket, and the motor in order to control power supply to the motor.

23 Claims, 4 Drawing Sheets

MULTI-POWER-SOURCE MOTOR ASSEMBLY FOR ROTISSERIE

FIELD OF THE INVENTION

The present invention relates to the structure of a motor assembly. More particularly, the invention relates to a motor assembly that is configured for a rotisserie and can be driven by various direct-current (DC) power sources (e.g., a battery, a mobile power pack, and a power cord with a rectifier) so that, once turned on, the motor assembly can rotate a spit inserted therein and the food on the spit over the rotisserie. The motor assembly disclosed herein not only can be used where there is mains electricity (e.g., connected to mains electricity through a power cord with a rectifier), but also can function where mains electricity is unavailable (e.g., powered by a battery or a mobile power pack), making it easy to roast food in the wild.

BACKGROUND OF THE INVENTION

Recently, with the improvement of living standards, people have paid more and more attention to recreational activities in order to relieve work pressure. Barbecues, for example, are immensely popular and can be enjoyed by family members and friends of all ages. This is especially true in the United States and Europe, where spacious yards are so common that barbecues have become basic family activities, serving both recreational and social purposes, and where therefore great emphasis is placed on the features of the roasting equipment required.

Referring to FIG. 1, a commercially available rotisserie P60 is provided with a burner P61 having a generally square U-shaped cross section. The burner P61 defines a receiving space P611 therein for receiving roasting utensils and related materials such as a grill rack, a gas stove, or charcoal (not shown). The burner P61 has two opposite sidewalls provided with two fixing frames P62 and P63 respectively. The fixing frame P63 can be mounted with a motor assembly P64. The motor assembly P64 has a lateral side provided with a rotating shaft hole P642. The motor assembly P64 is also provided therein with a motor (not shown), which obtains the electric power required for normal operation through a power cord P643 in order to rotate a rotating shaft (not shown). The rotating shaft hole P642 corresponds to the rotating shaft and can be fitted with a spit P70. The spit P70 has one end to be connected with the rotating shaft and the other end to be placed in a recess P624 of the fixing frame P62. The spit P70 is further provided with a pair of prongs P651 at an appropriate position. The spit P70 and the prongs P651 can be pushed through the food P80 to be roasted (e.g., the whole chicken shown in the drawing) so that, with the motor assembly P64 driving the spit P70 into rotation, the food P80 is rotated over and heated by the gas-fueled fire or charcoal in the burner P61.

While a barbecue is in most cases held where there is mains electricity (e.g., in a backyard or on a campsite where electricity is available through an extension cord), it may also take place in the wild (e.g., during travel). In the latter case, however, the motor assembly P64 becomes useless due to the lack of mains electricity. As a solution, motor assemblies configured to be powered by batteries (e.g., alkaline D batteries) were developed, but the capacities of common batteries are so limited that one who wishes to barbecue while traveling must carry multiple spare batteries with them in order to drive such a motor assembly throughout the entire roasting process. The spare batteries are nevertheless bulky, taking up a lot of space and therefore adding to the inconvenience of travel.

The issue to be addressed by the present invention is to design a motor assembly that is applicable to a rotisserie and can be driven by various DC power sources (e.g., mobile power packs and batteries) so that one can roast food in the wild, or anywhere without mains electricity or the required battery, by driving the motor assembly with the mobile power pack on hand, wherein the mobile power pack is generally compact in size and is carried by the user with the original intention to charge a mobile communication device.

BRIEF SUMMARY OF THE INVENTION

It is an objective of the present invention to provide a multi-power-source motor assembly for use with a rotisserie, wherein the motor assembly includes a housing, a fixing base, a DC motor, a reduction gear unit, at least one set of battery connections, at least one mobile power pack plug or socket, and a power switch. The housing forms a receiving space therein. The receiving space has a lower portion, in which a battery or a mobile power pack can be mounted. The lower portion of the receiving space is less likely to collect heat from the heat source in front of the housing than the other portions of the receiving space and is therefore suitable for receiving electronic or power source components that are not resistant to heat. The fixing base is made of an insulating material and is fixedly mounted in an upper portion of the receiving space in the housing. The upper portion of the receiving space is more likely to collect heat from the heat source in front of the housing than the other portions of the receiving space and is therefore suitable only for receiving mechanical components (e.g., the reduction gear unit) or electromechanical components (e.g., the DC motor) that are relatively resistant to heat. The DC motor is fixedly mounted on the fixing base and has a rotating shaft fixedly provided with a driving gear. The reduction gear unit is mounted on the fixing base and has an input gear and an outer gear. The input gear meshes with the driving gear. The output gear is protrudingly provided with an output shaft. The output shaft has a free end exposed on the front side of the housing and configured to connect with a spit. Once turned on, the DC motor rotates the output shaft through the reduction gear unit such that the spit is rotated along with the output shaft. The battery connections include a positive terminal connection and a negative terminal connection, are fixedly mounted in the lower portion of the receiving space, and are configured to connect with a positive terminal and a negative terminal of the battery respectively. The mobile power pack plug or socket is fixedly mounted on the housing, corresponds to the lower portion of the receiving space, and is configured to connect with the mobile power pack. The power switch is mounted on the outer wall of the housing and is separately and electrically connected to the battery connections, the mobile power pack plug or socket, and the DC motor in order to switch on and off power supply to the DC motor. With the battery or mobile power pack mounted in the lower portion of the receiving space (which portion is less prone to heat accumulation than the other portions of the receiving space), overheating of the battery or mobile power pack is effectively prevented to avoid danger associated with overheating and an abrupt reduction in battery/power pack capacity that may also arise from overheating. Not only that, the motor assembly makes it possible to roast food in the wild, or anywhere without mains electricity or the battery, for the motor assembly can be driven by the mobile power pack instead, wherein the mobile power pack typically has a compact design and is very likely to be on hand (to charge a mobile communication device in the first place, though).

Another objective of the present invention is to provide the foregoing multi-power-source motor assembly, wherein the motor assembly further includes a partition. The partition is made of an insulating material; matches the lower portion of the receiving space in shape; has a rear side concavely provided with a power source accommodating space, in which the battery or mobile power pack can be mounted; and has a front side fixedly mounted in the lower portion of the receiving space in the housing. The battery connections and the mobile power pack plug or socket are separately and fixedly mounted on the partition and correspond in position to the power source accommodating space.

Still another objective of the present invention is to provide the foregoing multi-power-source motor assembly, wherein the motor assembly further includes a plurality of rods and a supporting plate. The rods are made of an insulating material and each have one end fixed to the front side of the housing. The front side of the supporting plate is so shaped that the supporting plate can be assembled to the top side of the rotisserie. The rear side of the supporting plate is fixed to the other end of each rod and is spaced from the housing by a predetermined distance. The supporting plate is further formed with a through hole corresponding to a shaft hole of the housing so that the spit can pass through the through hole and connect to the free end of the output shaft. The arrangement described above ensures that the heat absorbed by the supporting plate from the rotisserie will not be transferred directly to the housing, and that therefore the electronic or power source components in the housing (e.g., the battery or mobile power pack) are kept from damage by overheating.

Yet another objective of the present invention is to provide the foregoing multi-power-source motor assembly, wherein the housing is formed with a plurality of convection holes corresponding to the power source accommodating space in order for the power source component in the power source accommodating space (e.g., the battery or mobile power pack) to operate in a well ventilated condition and stay at the optimal working temperature.

BRIEF DESCRIPTION OF THE SEVERAL VIEWS OF THE DRAWINGS

The objectives, shape, structural features, and effects of the present invention can be better understood by referring to the following detailed description of some illustrative embodiments of the invention in conjunction with the accompanying drawings, in which.

DETAILED DESCRIPTION OF THE INVENTION

Nowadays, mobile communication devices such as mobile phones (including smartphones) have become virtually indispensable. Most people would carry these devices with them in their daily lives, during work, and at play. Also, mobile power packs have come to be standard accessories to mobile communication device users in order to ensure normal operation of their mobile communication devices. Generally, a mobile power pack consists essentially of a lithium battery, whose electricity storage capacity per unit volume or per unit weight is far greater than those of common nickel-hydrogen batteries, and which therefore is ideal for use in mobile power packs nowadays. Mobile power packs vary widely in capacity from thousands to tens of thousands of milliamperes, and it is important to mind the ambient temperature of a mobile power pack during use because the capacity of the lithium battery inside may be suddenly reduced due to an exceedingly high or low temperature of the working environment. As is well known in the art, the majority of lithium batteries have a working temperature between −20° C. and 60° C., and the optimal working temperature ranges from 0° C. to 40° C. That said, incidents of mobile power pack combustion or explosion are not uncommon in the news. While some minor cases only startled the users, serious ones caused fires. In particular, a mobile power pack tends to heat up rapidly in a poorly ventilated environment (e.g., a high-temperature closed space), and if the power pack is still in operation upon reaching a certain high temperature, the temperature of its lithium battery will keep rising, turning the battery into a highly flammable or explosive medium.

In view of the fact that mobile power packs have become standard accessories carried practically all the same by most mobile communication device users and feature much greater capacities per unit volume or unit weight than common batteries, the inventor of the present invention came up with a multi-power-source motor assembly that not only is compact in size, but also can work with a rotisserie and draw power from a mobile power pack.

Figure 1:
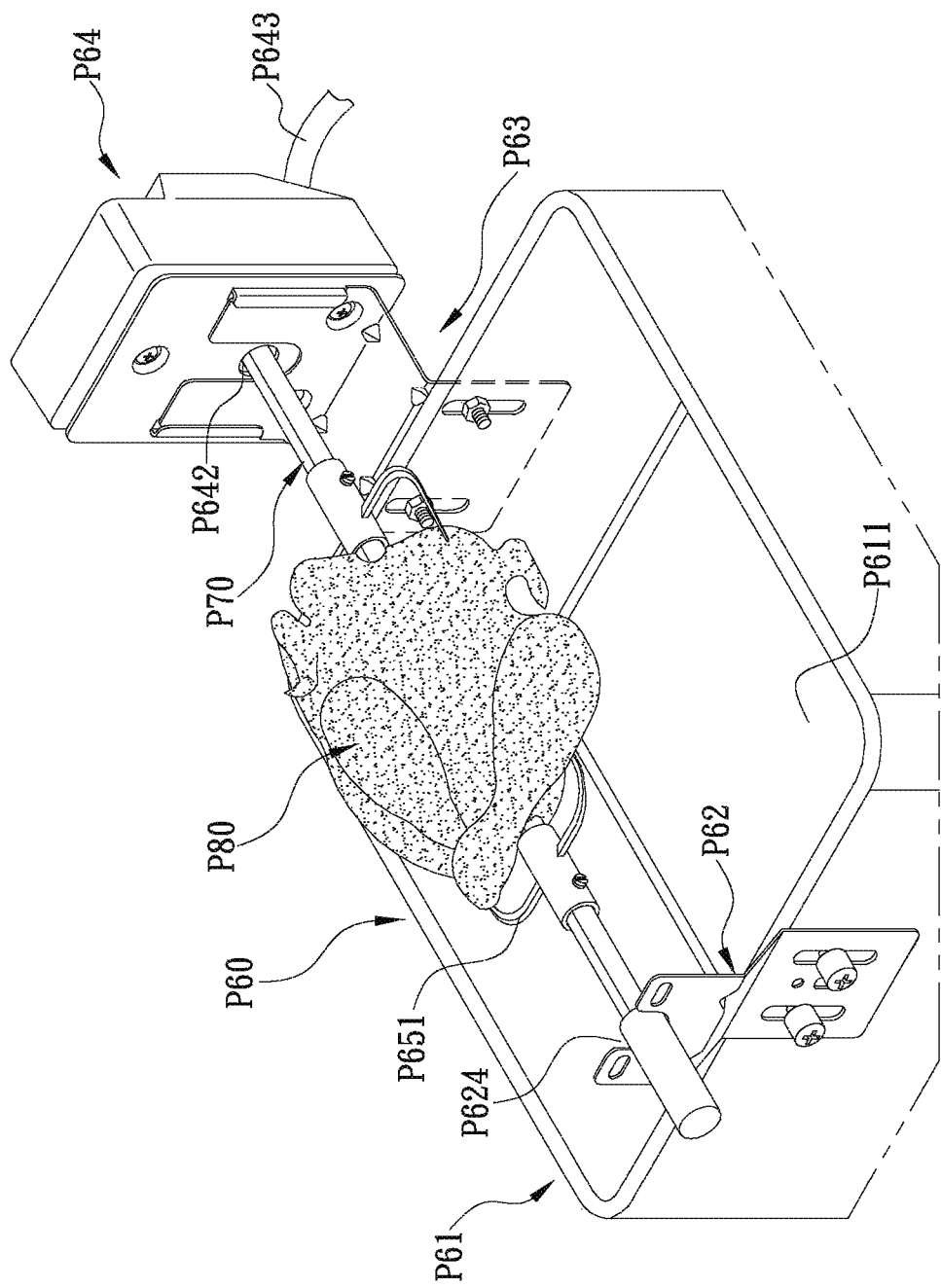
FIG. 1 is a perspective view showing the structure of a conventional rotisserie.
Figure 2:
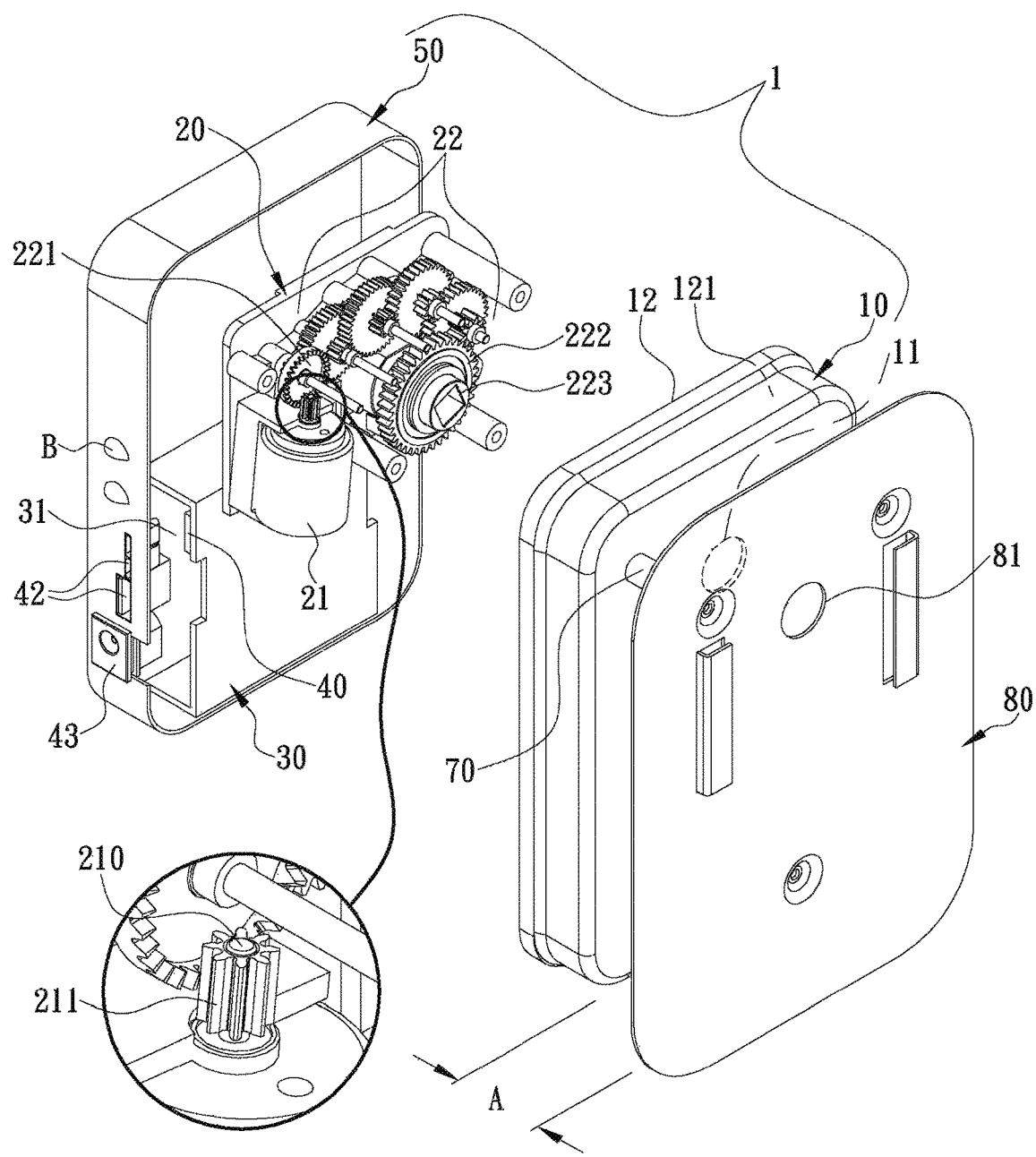
FIG. 2 is an exploded perspective view of the present invention.
Figure 3:
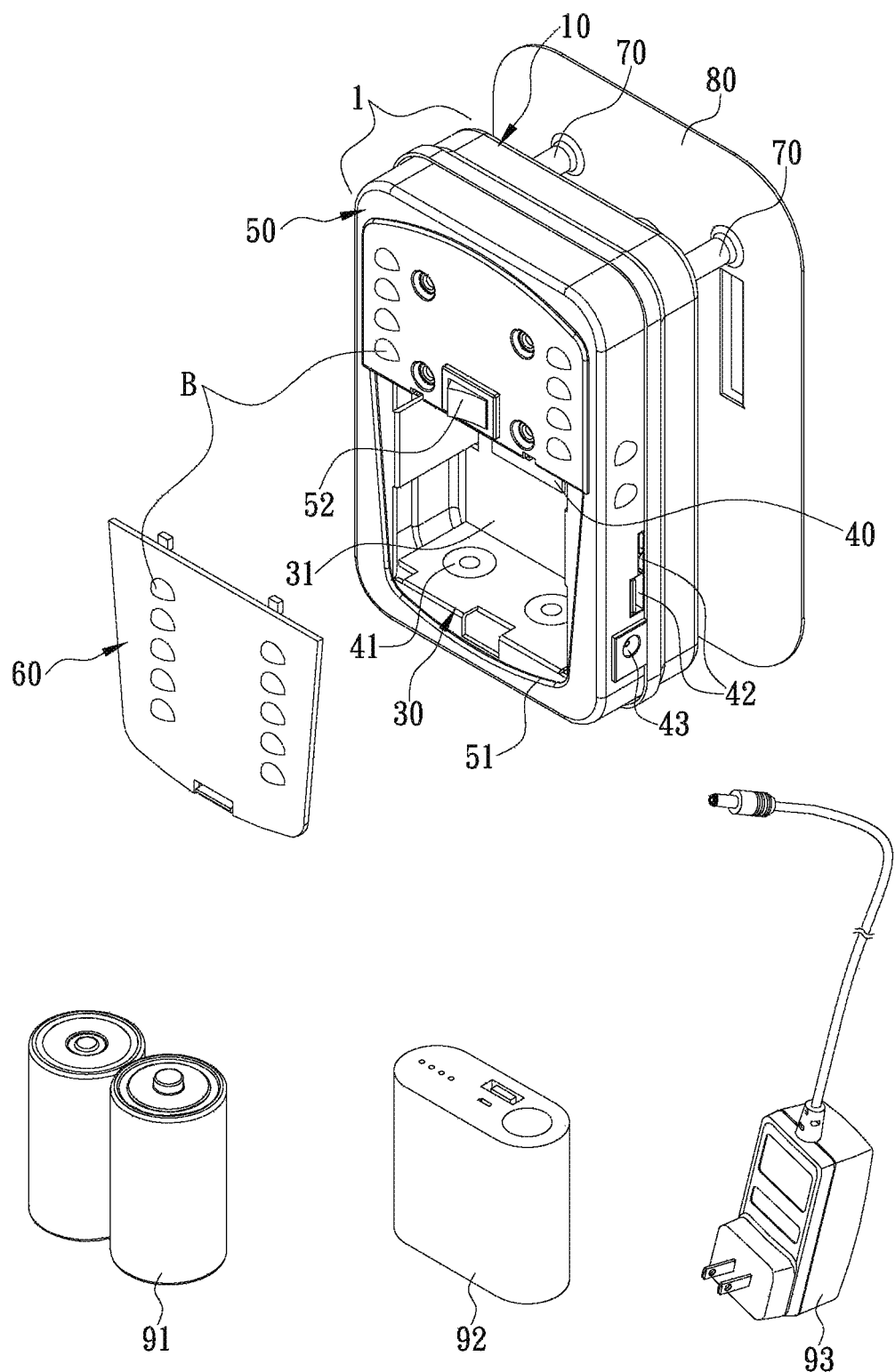
FIG. 3 is an assembled perspective view of the present invention.

Referring to FIG. 2 and FIG. 3, a multi-power-source motor assembly according to the present invention includes a housing 1, a fixing base 20, a DC motor 21, a reduction gear unit 22, at least one set of battery connections 41, at least one mobile power pack plug or socket 42 (e.g., a USB plug or socket), and a power switch 52. The housing 1 forms a receiving space 121 therein. The receiving space 121 has a lower portion, in which a battery 91 or a mobile power pack 92 can be mounted. The battery 91 or the mobile power pack 92 is to be mounted in the lower portion of the receiving space 121 because this portion is less likely to collect heat from the heat source in front of the housing 1 than the other portions of the receiving space 121 and is hence suitable for receiving electronic or power source components that are not resistant to heat. The fixing base 20 is made of an insulating material and is fixedly mounted in an upper portion of the receiving space 121 in the housing 1. The upper portion of the receiving space 121 is more likely to collect heat from the heat source in front of the housing 1 than the other portions of the receiving space 121 and therefore can only be used to receive relatively heat-resistant mechanical components (e.g., the reduction gear unit 22) or relatively heat-resistant electromechanical components (e.g., the DC motor 21). The DC motor 21 is fixedly mounted on the fixing base 20 and has a rotating shaft 210 fixedly provided with a driving gear 211. The reduction gear unit 22 is mounted on the fixing base 20 and has an input gear 221 meshing with the driving gear 211. The reduction gear unit 22 further has an output gear 222 protrudingly provided with an output shaft 223. The output shaft 223 has a free end exposed on the front side of the housing 1 and configured to connect with a spit (not shown). Once turned on, the DC motor 21 rotates the output shaft 223 through the reduction gear unit 22 such that the spit is rotated along with the output shaft 223. The battery connections 41 include a positive terminal connection and a negative terminal connection, which are mounted in the lower portion of the receiving space 121 in the housing 1 and are configured to connect with the positive terminal and the negative terminal of the battery 91 respectively. The mobile power pack plug or socket 42 is a plug or socket complying with the USB specifications, is fixedly mounted on the inner wall or the outer wall of the housing 1 at a position corresponding to the lower portion of the receiving space 121, and is configured to connect with the mobile power pack 92 either directly or through a USB connection cable. The power switch 52 is mounted on the outer wall of the housing 1 and is separately and electrically connected to the battery connections 41, the mobile power pack plug or socket 42, and the DC motor 21 in order to switch on and off power supply to the DC motor 21.

As the battery 91 or the mobile power pack 92 is mounted in the lower portion of the receiving space 121 (i.e., a portion of the receiving space 121 that is less prone to heat accumulation than elsewhere of the receiving space 121), hazards and an abrupt reduction in battery/power pack capacity that are attributable to overheating of the battery 91 or the mobile power pack 92 are effectively prevented. Moreover, where mains electricity and the battery 91 are unavailable, one can still roast a large amount of food by driving the motor assembly with the mobile power pack 92 carried with them.

In a preferred embodiment of the present invention, referring to FIG. 2 and FIG. 3, the housing 1 of the multi-power-source motor assembly includes a front housing section 10 and a rear housing section 50. The front housing section 10 has a front side formed with a shaft hole 11. The rear side of the front housing section 10 is formed with an opening 12, with the receiving space 121 formed inside the opening 12 and communicating with the shaft hole 11. The opening 12 is larger than the fixing base 20 in shape so that the fixing base 20 can pass through the opening 12 and be fixedly mounted in the upper portion of the receiving space 121 in the front housing section 10. The rear housing section 50 matches the opening 12 in shape and is configured to be assembled to the opening 12 to cover the upper portion of the receiving space 121. Additionally, the rear housing section 50 is formed with a mounting hole 51 corresponding to the lower portion of the receiving space 121. The battery 91 or the mobile power pack 92 can be mounted into the lower portion of the receiving space 121 through the mounting hole 51.

In another preferred embodiment of the present invention, referring again to FIG. 2 and FIG. 3, the multi-power-source motor assembly further includes a partition 30 and a control circuit 40. The partition 30 is made of an insulating material, matches the lower portion of the receiving space 121 in shape, and has a rear side concavely provided with a power source accommodating space 31, in which the battery 91 or the mobile power pack 92 can be mounted. The front side of the partition 30 is fixedly mounted in the lower portion of the receiving space 121 in the front housing section 10. The control circuit 40, the battery connections 41, and the mobile power pack plug or socket 42 are all fixedly mounted on the partition 30 and correspond in position to the power source accommodating space 31. The control circuit 40 is separately and electrically connected to the battery connections 41, the mobile power pack plug or socket 42, the power switch 52, and the DC motor 21 so as to control power supply to the DC motor 21. The partition 30 effectively separates the upper and lower portions of the receiving space 121 to ensure that the heat absorbed by the front housing section 10 from a rotisserie will not be transmitted directly to the power source accommodating space 31. This arrangement protects the electronic or power source components in the power source accommodating space 31 (e.g., the battery 91 or the mobile power pack 92, and the control circuit 40) from damage which may otherwise result from overheating.

In yet another preferred embodiment of the present invention, with continued reference to FIG. 2 and FIG. 3, the multi-power-source motor assembly further includes a cover 60 and a power socket 43. The cover 60 matches the mounting hole 51 in shape and is configured to be assembled to the mounting hole 51 and thereby cover the power source accommodating space 31. The power socket 43 is fixedly mounted on the partition 30, corresponds in position to the power source accommodating space 31, and has an insertion end, wherein the insertion end is exposed outside the front housing section 10 or the rear housing section 50 and is configured to connect with a power cord 93 with a rectifier. Also, the power socket 43 is electrically connected to the control circuit 40 so that the multi-power-source motor assembly can be used where mains electricity is available.

In still another preferred embodiment of the present invention, referring again to FIG. 2 and FIG. 3, the multi-power-source motor assembly further includes a plurality of rods 70 and a supporting plate 80 to ensure that the battery 91 or the mobile power pack 92 operates at the optimal working temperature (e.g., 0° C. to 40° C.). Each rod 70 is made of an insulating material and is fixed to the front side of the housing 1 at one end. The supporting plate 80 is larger than the front side of the housing 1 in terms of their overall shapes. The rear side of the supporting plate 80 is fixed to the other end of each rod 70 and is spaced from the housing 1 by a predetermined distance A. The front side of the supporting plate 80 has a shape that allows the supporting plate 80 to be assembled to the top side of a rotisserie (not shown). With the supporting plate 80 having a larger overall shape than the front side of the housing 1 and having its rear side spaced from the housing 1 by the predetermined distance A, the heat generated by the rotisserie is effectively kept from moving past the supporting plate 80 and reaching the front housing section 10. Moreover, the heat absorbed by the supporting plate 80 from the rotisserie will not be transferred directly to the front housing section 10, and the electronic or power source components in the front housing section 10 (e.g., the battery 91 or the mobile power pack 92, and the control circuit 40) are therefore effectively protected from damage associated with overheating. In addition, the supporting plate 80 is formed with a through hole 81 corresponding to the shaft hole 11 so that the spit can pass through the through hole 81 and connect with the free end of the output shaft 223. In order for the battery 91 or the mobile power pack 92 to operate in a well ventilated condition and stay at the optimal working temperature (e.g., 0° C. to 40° C.), the front housing section 10, the rear housing section 50, or the cover 60 is formed with a plurality of convection holes B corresponding to the lower portion of the receiving space 121 or the power source accommodating space 31. These convection holes B allow the electronic or power source components in the lower portion of the receiving space 121 or in the power source accommodating space 31 (e.g., the battery 91 or the mobile power pack 92, and the control circuit 40) to work in a well ventilated condition and remain at the optimal working temperature.

Figure 4:
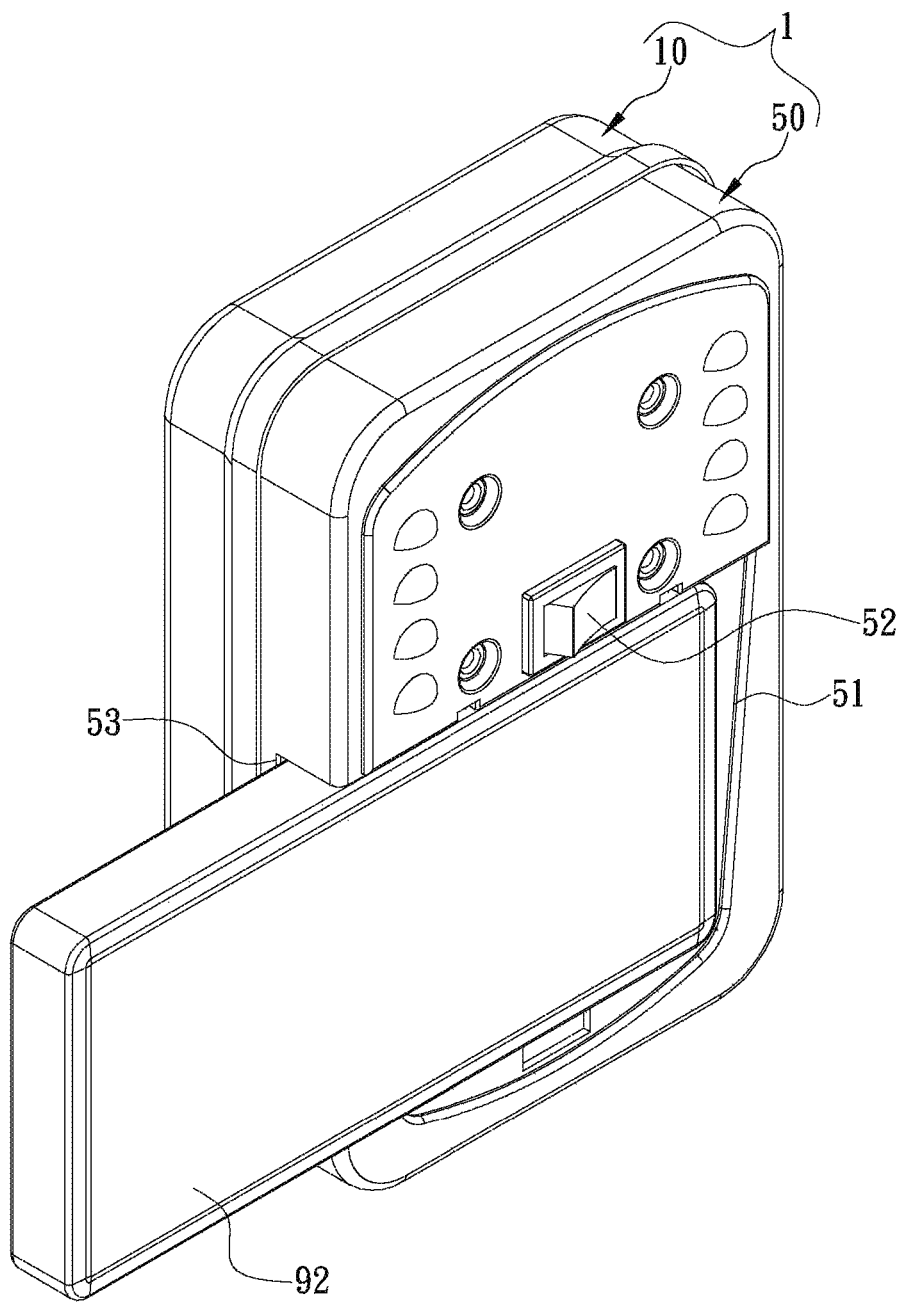
FIG. 4 is a perspective view showing a mobile power pack connected to the present invention.

In a further preferred embodiment of the present invention, referring to FIG. 3 and FIG. 4, the side of the rear housing section 50 that is adjacent to the mounting hole 51 is further formed with an insertion hole 53, in order for mobile power packs 92 of different sizes to be positioned in the power source accommodating space 31 and connect with the mobile power pack plug or socket 42. The insertion hole 53 is in communication with the mounting hole 51 so that, by passing through the insertion hole 53 into the mounting hole 51, a relatively long or relatively thick mobile power pack 92 can still be connected to the mobile power pack plug or socket 42 and positioned in the power source accommodating space 31 without falling off. Moreover, the cover 60 matches the mounting hole 51 and the insertion hole 53 in shape in order to cover the power source accommodating space 31 when mounted to the mounting hole 51 and the insertion hole 53.

While the invention herein disclosed has been described by means of specific embodiments, numerous modifications and variations could be made thereto by those skilled in the art without departing from the scope of the invention set forth in the claims.

What is claimed is:

1. A multi-power-source motor assembly for a rotisserie, comprising:
    a housing forming a receiving space therein, wherein the receiving space has a lower portion; and the housing comprises:
        a front housing section having a front side formed with a shaft hole and a rear side formed with an opening, wherein the opening forms the receiving space therein, the receiving space is in communication with the shaft hole, and the opening is larger than the fixing base in shape so that the fixing base is able to pass through the opening and be fixedly mounted in the upper portion of the receiving space in the front housing section; and
        a rear housing section matching the opening in shape and mounted to the opening to cover the upper portion of the receiving space, the rear housing section being formed with a mounting hole corresponding to the lower portion of the receiving space;
    a fixing base fixedly mounted in an upper portion of the receiving space in the housing;
    a direct-current (DC) motor fixedly mounted on the fixing base and having a rotating shaft fixedly provided with a driving gear;
    a reduction gear unit mounted on the fixing base, the reduction gear unit comprising an input gear meshing with the driving gear and an output gear protrudingly provided with an output shaft, wherein the output shaft has a free end exposed on a front side of the housing and configured to connect with a spit, and the DC motor, when turned on, rotates the output shaft through the reduction gear unit such that the spit is rotated with the output shaft;
    at least one set of battery connections comprising a positive terminal connection and a negative terminal connection, wherein the positive terminal connection and the negative terminal connection are fixedly mounted in the lower portion of the receiving space in the housing and are configured to connect with a positive terminal and a negative terminal of a battery respectively;
    at least one mobile power pack plug or socket fixedly mounted on the housing, corresponding to the lower portion of the receiving space, and configured to connect with a mobile power pack;
    a power switch mounted on an outer wall of the housing and separately and electrically connected to the battery connections, the mobile power pack plug or socket, and the DC motor in order to switch on and off power supply to the DC motor; and
    a partition matching the lower portion of the receiving space in shape, wherein the partition has a rear side concavely provided with a power source accommodating space, the partition further has a front side fixedly mounted in the lower portion of the receiving space in the front housing section, and the battery connections and the mobile power pack plug or socket are separately and fixedly mounted on the partition and correspond in position to the power source accommodating space; and
    a battery or a mobile power pack is mounted in the power source accommodating space.

2. The multi-power-source motor assembly of claim 1, further comprising a control circuit fixedly mounted on the partition and corresponding in position to the power source accommodating space, wherein the control circuit is separately and electrically connected to the battery connections, the mobile power pack plug or socket, the power switch, and the DC motor in order to control power supply to the DC motor.

3. The multi-power-source motor assembly of claim 2, further comprising a cover matching the mounting hole in shape and configured to be assembled to the mounting hole to cover the power source accommodating space.

4. The multi-power-source motor assembly of claim 3, further comprising a power socket fixedly mounted on the partition and corresponding in position to the power source accommodating space, wherein the power socket has an insertion end exposed outside the housing and configured to connect with a power cord with a rectifier, and the power socket is electrically connected to the control circuit.

5. The multi-power-source motor assembly of claim 3, further comprising:
    a plurality of rods each having an end fixed to the front side of the housing; and
    a supporting plate having a front side and a rear side, wherein the front side of the supporting plate is shaped to enable assembly of the supporting plate to a top side of the rotisserie, the rear side of the supporting plate is fixed to an opposite end of each of the rods and is spaced from the housing by a predetermined distance, and the supporting plate is formed with a through hole corresponding to the shaft hole, allowing the spit to pass through the through hole and connect with the free end of the output shaft.

6. The multi-power-source motor assembly of claim 4, further comprising:
    a plurality of rods each having an end fixed to the front side of the housing; and
    a supporting plate having a front side and a rear side, wherein the front side of the supporting plate is shaped to enable assembly of the supporting plate to a top side of the rotisserie, the rear side of the supporting plate is fixed to an opposite end of each of the rods and is spaced from the housing by a predetermined distance, and the supporting plate is formed with a through hole corresponding to the shaft hole, allowing the spit to pass through the through hole and connect with the free end of the output shaft.

7. The multi-power-source motor assembly of claim 5, wherein the supporting plate is larger in shape than the front side of the housing.

8. The multi-power-source motor assembly of claim 6, wherein the supporting plate is larger in shape than the front side of the housing.

9. The multi-power-source motor assembly of claim 7, wherein the rear housing section has a side adjacent to the mounting hole and formed with an insertion hole; the insertion hole is in communication with the mounting hole in order for the mobile power pack to pass through the insertion hole, connect with the mobile power pack plug or socket, and be positioned in the power source accommodating space; and the cover matches the mounting hole and the insertion hole in shape in order to cover the power source accommodating space when assembled to the mounting hole and the insertion hole.

10. The multi-power-source motor assembly of claim 8, wherein the rear housing section has a side adjacent to the mounting hole and formed with an insertion hole; the insertion hole is in communication with the mounting hole in order for the mobile power pack to pass through the insertion hole, connect with the mobile power pack plug or socket, and be positioned in the power source accommodating space; and the cover matches the mounting hole and the insertion hole in shape in order to cover the power source accommodating space when assembled to the mounting hole and the insertion hole.

11. The multi-power-source motor assembly of claim 9, wherein the fixing base, the partition, or the rods are made of an insulating material.

12. The multi-power-source motor assembly of claim 10, wherein the fixing base, the partition, or the rods are made of an insulating material.

13. The multi-power-source motor assembly of claim 11, wherein the housing or the cover is formed with a plurality of convection holes corresponding to the lower portion of the receiving space.

14. The multi-power-source motor assembly of claim 12, wherein the housing or the cover is formed with a plurality of convection holes corresponding to the lower portion of the receiving space.

15. The multi-power-source motor assembly of claim 13, wherein the mobile power pack plug or socket is a plug or socket complying with USB specifications.

16. The multi-power-source motor assembly of claim 14, wherein the mobile power pack plug or socket is a plug or socket complying with USB specifications.

17. The multi-power-source motor assembly of claim 1, further comprising:
a plurality of rods each having an end fixed to the front side of the housing; and
a supporting plate having a front side and a rear side, wherein the front side of the supporting plate is shaped to enable assembly of the supporting plate to a top side of the rotisserie, the rear side of the supporting plate is fixed to an opposite end of each of the rods and is spaced from the housing by a predetermined distance, and the supporting plate is formed with a through hole corresponding to the shaft hole, allowing the spit to pass through the through hole and connect with the free end of the output shaft.

18. The multi-power-source motor assembly of claim 2, further comprising:
a plurality of rods each having an end fixed to the front side of the housing; and
a supporting plate having a front side and a rear side, wherein the front side of the supporting plate is shaped to enable assembly of the supporting plate to a top side of the rotisserie, the rear side of the supporting plate is fixed to an opposite end of each of the rods and is spaced from the housing by a predetermined distance, and the supporting plate is formed with a through hole corresponding to the shaft hole, allowing the spit to pass through the through hole and connect with the free end of the output shaft.

19. The multi-power-source motor assembly of claim 17, wherein the supporting plate is larger in shape than the front side of the housing.

20. The multi-power-source motor assembly of claim 18, wherein the supporting plate is larger in shape than the front side of the housing.

21. The multi-power-source motor assembly of claim 19, wherein the mobile power pack plug or socket is a plug or socket complying with USB specifications.

22. The multi-power-source motor assembly of claim 1, wherein the mobile power pack plug or socket is a plug or socket complying with USB specifications.

23. The multi-power-source motor assembly of claim 20, wherein the mobile power pack plug or socket is a plug or socket complying with USB specifications.

* * * * *